Feb. 19, 1963  A. H. MARTINI  3,078,117
CAMPING AND TOURING TRAILER
Filed Feb. 27, 1961  3 Sheets-Sheet 3

INVENTOR.
Arthur H. Martini

# United States Patent Office 3,078,117
Patented Feb. 19, 1963

3,078,117
CAMPING AND TOURING TRAILER
Arthur H. Martini, 372 Elm St., West Hempstead, N.Y.
Filed Feb. 27, 1961, Ser. No. 91,748
3 Claims. (Cl. 296—23)

This invention relates to a small highly compact trailer, more particularly to a camping and touring trailer having a collapsible superstructure, which is adapted to be towed by a motor vehicle. This trailer provides living accommodations for four to five persons when the superstructure is in the erected position, and provides a low silhouette for minimum wind resistance when the superstructure is knocked down for towing. In the knocked down position the overall width of this trailer is not greater than the overall width of the average standard American passenger automobile.

The principal object of the invention is to provide a small, compact, lightweight and easily towed trailer with a collapsible superstructure which may simply and quickly be erected to provide all the essential living and sleeping requirements for four to five persons; and which has a towing width no greater than that of a standard American passenger automobile, and a towing height which is sufficiently low to prevent interference with the rear vision of the driver of the towing vehicle.

A further object of the invention is to provide a completely rainproof enclosure when the trailer is either in the knocked down or fully erected positions.

A still further object of this invention is to provide a rigid full top cover for the trailer and knocked down elements of the superstructure, and a maximum number of solid side walls when the superstructure is in the erected position.

Still another object of this invention is to utilize canvas material for one of the sidewalls of the superstructure which, when desired, may be either rolled up to provide ventilation or may be extended outwardly from the trailer and erected on poles to form an awning or canopy over the trailer's entrance approach.

A still further object of this invention is to provide means for access through the permanent immovable sidewalls of the trailer base unit to the ice box and other internal areas where foodstuffs and cooking utensils are stored to thus permit the preparation of meals at roadside stops, while enroute to a destination, without having to erect the superstructure.

Other features and advantages will be apparent from the following description and from the drawings, in which.

Similar reference numerals refer to similar parts and portions throughout the drawings.

Figure 1:
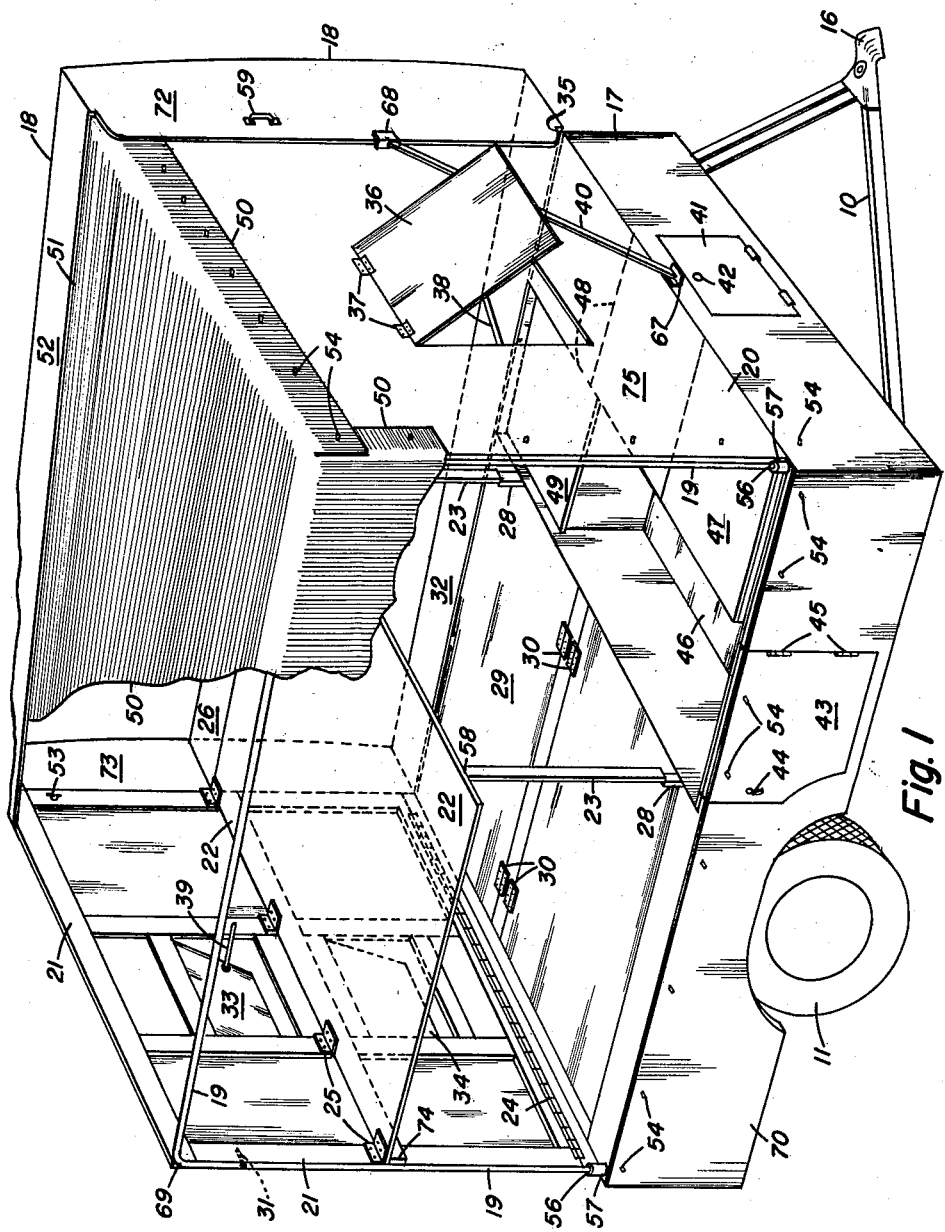
FIGURE 1 is a perspective view of the entire trailer with its superstructure in the fully erected position but with the canvas roof and right sidewall partially cut away.

The A frame 10, wheels 11, axle 12, springs 13, spring shackles 14, spring mounts 15, and trailer hitch 16, constitute the basic conventional components of the trailer chassis assembly as shown in the drawings.

Figure 2:
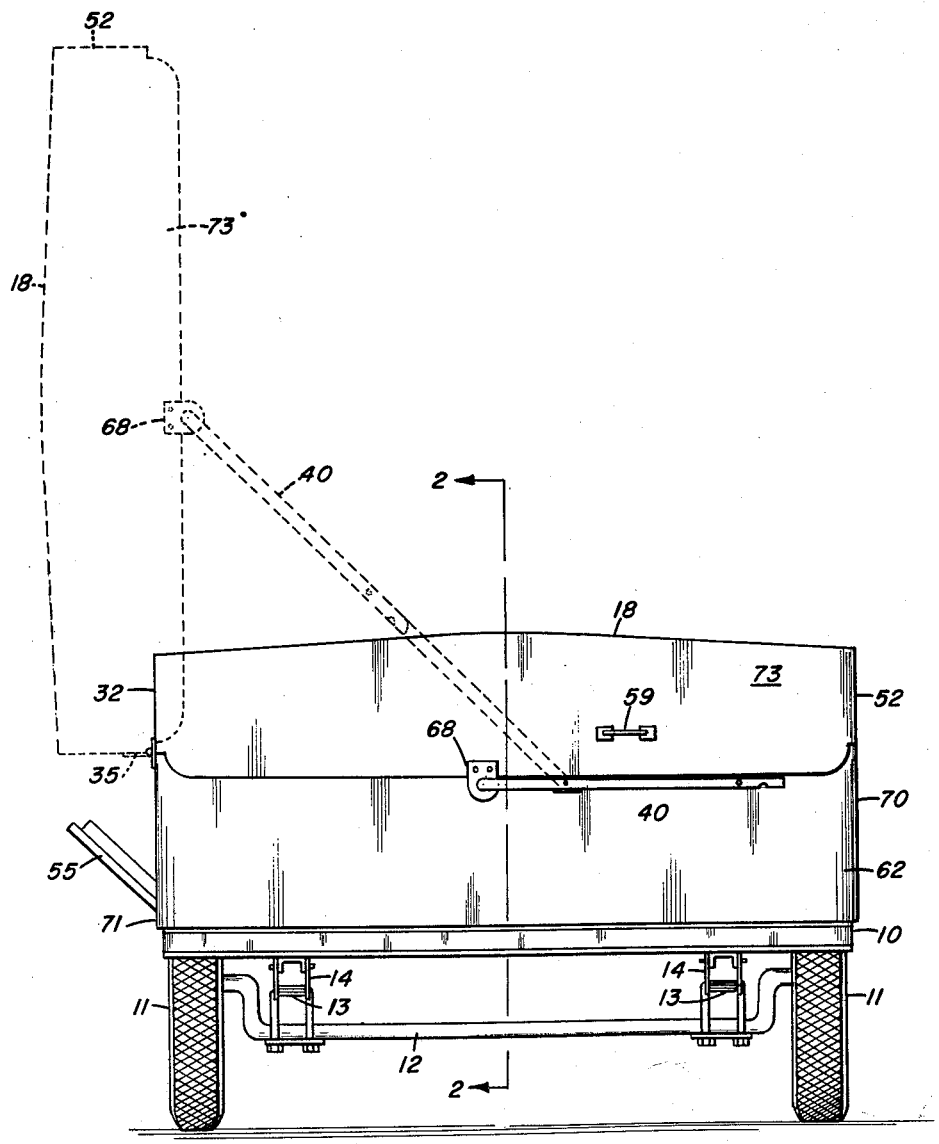
FIGURE 2 is a rear view of the trailer with its superstructure fully knocked down and with the top cover in its closed position.
Figure 3:
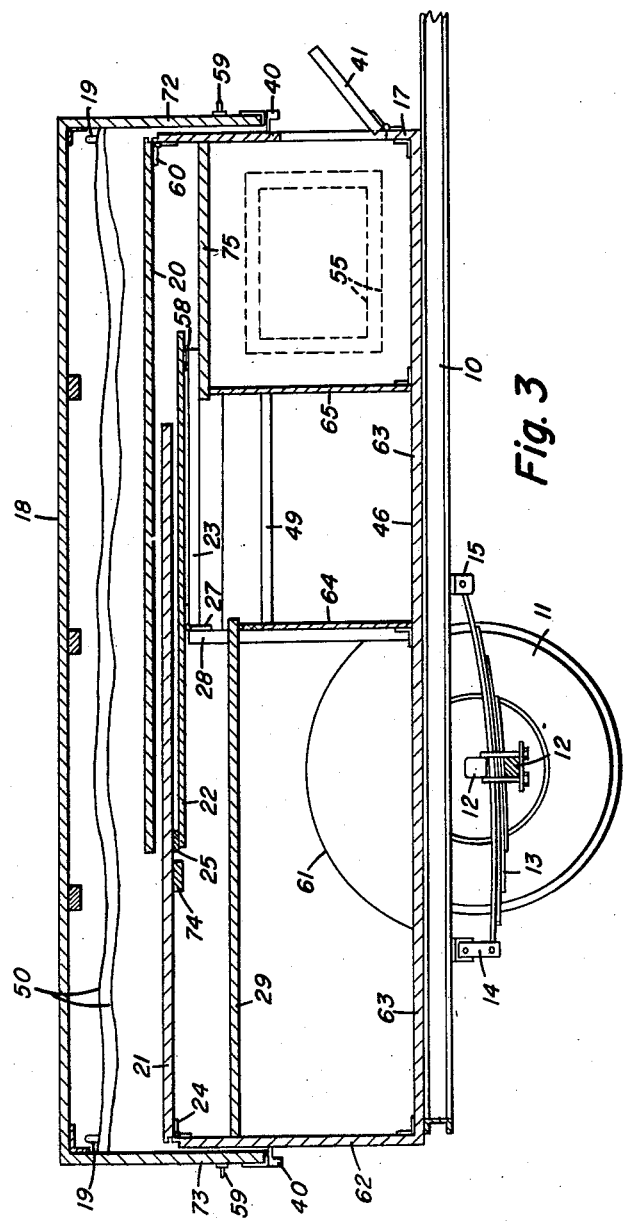
FIGURE 3 is a sectional view of the side of the trailer taken along the line 2—2 of FIGURE 2.

The trailer base unit enclosure is formed by floor 63, front wall 17, rear wall 62, left wall 71, right wall 70, and entrance door 43. The transverse partition 65 within the trailer base unit forms the galley area, and the transverse partition 64 forms the storage and bed section. Those parts of the galley area covered by swinging covers 47 and 75 provide for storage of the stove, cooking utensils and non-perishable foodstuffs, and the area covered by swinging cover 48 contains a built-in ice box. Access door 41 in front wall 17 of trailer base unit is opened by lock 42 and provides access to the cooking utensils and foodstuffs within the galley section when the trailer is fully knocked down as shown in FIGURES 2 and 3. Similarly, the ice box side access door 55 in the left sidewall 71 of the trailer base unit provides access to the refrigerated foods and permits ice to be loaded at roadside stops while the trailer is in the knocked down position as shown in FIGURES 2 and 3. In the storage and bed section formed by partition 64, the swinging covers 29, hinged at 30, provide access to the storage space below and when closed form the mattress base for the lower double size bed.

The entrance door 43 swinging on hinges 45 and opened by lock handle 44 provides the means for entering the trailer and moving about the walk space shown as 46. The enclosure 49 at the end of walk space 46 houses a toilet facility.

The entire trailer base unit together with the knocked down elements of the superstructure are completely covered by the box-like top cover 18 as shown in FIGURES 2 and 3 of the drawings, in which the various side panels of cover 18 are identified as front panel 72, rear panel 73, left panel 32, and right panel 52. Top cover 18 is hinged along the entire lower left edge of panel 32 to the left sidewall 71 of the trailer base unit by hinge 35, thereby permitting the cover 18 to be rotated 90 degrees about the pintle of hinge 35 from the fully closed horizontal position to the fully open vertical position, this latter position being shown by the dotter lines in FIGURE 2. Said vertical position of cover 18 is maintained by two folding cover braces identified as 40 which are attached to the front wall 17 and rear wall 62 of the trailer base unit by means of bracket 67, and to the front panel 72 and rear panel 73 of cover 18 by means of mounting brackets 68. Thus, it will be seen that cover 18 serves the two-fold purpose of covering the entire trailer when the superstructure is knocked down as shown in FIGURES 2 and 3 with the cover 18 in the horizontal position, and also of forming the left sidewall of the superstructure when this same cover 18 is raised to the vertical position. The side panels 32, 52, 72 and 73 of cover 18 provide depth and rigidity to the cover and cause it to overhang the left sidewall 71 of the trailer base when the cover is positioned vertically as shown more particularly by the dotted lines in FIGURE 2. This overhanging feature effects an automatic increase in the width of the trailer and a broadening of the inhabitable interior to thus provide full sleeping headroom for the two transverse beds 22 and 29. The height of the lower bed base 29 is such that it is in horizontal alignment with the interior surface of the overhanging left side panel 32 of cover 18. Front panel 72 and rear panel 73 of cover 18 overlap the corresponding side walls 17 and 62 of the trailer base unit, while the lower edges of right panel 52 and left panel 32 of cover 18 butt directly into the edges of the corresponding sidewalls of the trailer base unit. Said butt joints are backed up by battens fastened interiorly to the trailer base unit to prevent rain seepage through the joint. Front panel 72 and rear panel 73 of cover 18 are considerably broader than the cover's right panel 52 and left panel 32 so that when cover 18 is vertically positioned front panel 72 and rear panel 73 overlap the hinged front sidewall 20 and rear sidewall 21 of the superstructure and provide a means for attaching these elements of the superstructure together when the trailer is being prepared for occupancy.

The front fold-down wall panel 20 of the superstructure is attached along its lower edge to the top edge of the front wall 17 of the trailer base unit by means of strip hinge 60 interiorly mounted. The edges of panel 20 and wall 17 which meet along hinge line 60 have complementary longitudinal steps which form an overlapping joint to prevent rain seepage. Front wall panel 20 has a hinged awning type window cut out panel 36 which provides light and ventilation to the interior of the trailer. Window panel 36 is mounted to front wall panel 20 by means of hinges 37 and its movement and adjustment is controlled by adjusting arm 38.

The rear fold-down wall panel 21 of the superstructure is attached along its lower edge to the top edge of the rear wall 62 of the trailer base unit by means of strip hinge 24 interiorly mounted. The edges of panel 21 and wall 62 which meet along hinge line 24 are longitudinally stepped forming an overlap type joint to prevent rain seepage. Rear panel 21 has two hinged awning type window cut-out panels 33 and 34 to provide light and ventilation for the upper bed 22 and lower bed 29 respectively. An adjusting arm is used on each of the window panels 33 and 34 to control and maintain the window openings and is indicated by the numeral 39.

The upper bed 22 is fastened to, and partially supported by, the rear wall panel 21 by means of hinges 25 and support strip 74. The side of bed 22 opposite to the hinge side is supported by two folding legs, both identified by the numeral 23, which are fastened to the bed by means of hinges 58 and to the trailer base unit through bed support posts 28 by means of hinges 27. Thus, the upper bed 22 automatically erects into usable position when the rear wall panel 21 is raised to its vertical position, and bed 22 lowers and folds compactly into the trailer base unit when the wall panel 21 is folded down to its horizontal position. When bed 22 is in lowered position one folding bed support leg 23 rests directly upon the galley swinging cover 47, and the second leg 23 rests upon the ice box cover 48.

The roof and right sidewall of the superstructure are formed by a continuous waterproof canvas, or equivalent fabric material, which is designated by the numeral 50 in the drawings, and more particularly in FIGURE 1 where the canvas forming the roof and right sidewall is identified as 50 and is shown as a partial cut-away. The upper end of canvas fabric 50 is designated by the numeral 51 and is permanently attached to the inside of the right side panel 52 of trailer top cover 18. All the other edges of the canvas 50 generously overlap the front wall panel 20 and rear wall panel 21 of the superstructure and the right side panel 70 of the trailer base unit. These overlapping edges are fastened to said panels 20, 21, and 70 by means of conventional canvas fasteners, shown as 54. The canvas fabric 50 is supported and erected into position by the U-shaped pipe frame 19, and is attached to pipe frame 19 by means of an internal fabric sleeve sown to canvas 50 along the line where said canvas forms the upper right corner of the superstructure. Pipe frame 19 is inserted through said sown sleeve and thereby lifts canvas 50 to its erected position when pipe frame 19 is elevated. Pipe frame 19 provides a rigid support for canvas 50 along the line that forms the upper right corner of the superstructure. The arms of U-shaped pipe frame 19 terminate with conventional awning type swivel fittings 56 which engage complementary fittings on the support pipes 57 which are permanently secured to the trailer base unit. The pivot points of said fittings 56 are such that the U-shaped pipe frame 19 will just clear the front wall panel 20 and rear wall panel 21 when these panels are in their lowered positions. Pipe frame 19 therefore, when lowered, comes to rest upon panels 20 and 21 and carries a portion of canvas 50 to which it is attached down with it. In the lowered position the arms of pipe frame 19 are approximately horizontal.

Having described the separate operating components of this trailer, the step-by-step operations required to convert it from its knocked down towing position as shown in FIGURES 2 and 3 to its fully erected position for occupancy as shown in FIGURE 1 are as follows:

The handles 59 on front panel 72 and rear panel 73 of top cover 18 are used for lifting cover 18 until it has rotated 90 degrees about the pintle of cover hinge 35, at which point the cover braces 40 are fully unfolded and lock the upended cover in the vertical position as shown by dotted line in FIGURE 2. In so doing, the upper end 51 of the canvas cover 50 which is permanently attached to the right side panel 52 of cover 18 is partially elevated into position. Next, the U-shaped pipe frame 19 is raised from its horizontal to its vertical position by pivoting about the awning type swivel fittings 56 which causes the canvas 50 to be fully erected to form the roof of the superstructure and to temporarily leave the right wall canvas 50 hanging down loosely from the cross member of pipe frame 19. While the pipe frame 19 is held vertically, the front panel 20 of the superstructure is raised to its vertical position where it is stopped by the elongated lip of front panel 72 of top cover 18 which overlaps front panel 20 for its entire length. Front panel 20 is fastened to the overlapping lip of panel 72 by a thumb screw similar to screw 53 shown for rear panel 21. The pipe frame 19 is now partially supported vertically by panel 20 which has moved behind its front arm. Next, the rear panel 21 is raised to the vertical where it is stopped by the elongated lip of rear panel 73 of top cover 18 to which it is fastened by means of thumb screw 53. As previously described, the upper bed 22 is simultaneously erected into position as rear panel 21, to which it is attached, is raised to the vertical. The loose extension panel 26 for upper bed 22 is inserted within the confines of top cover 18, as shown in FIGURE 1, and rests on suitably supported cleats attached internally to top cover 18. The pipe frame 19 is fastened to rear panel 21 by means of screw 31, and is similarly fastened to front panel 20, to stabilize the superstructure and increase its rigidity. The loose ends of canvas 50 are then clipped to the fasteners 54 on the front panel 20 and rear panel 21 of the superstructure and to the right side wall 70 of the trailer base unit. The roof of the superstructure formed by canvas 50 is pitched away from the permanently fastened upper edge of canvas 50 at point 51 and follows the pitch built in to the top edge of front panel 20 and rear panel 21 of the superstructure. The canvas 50 which forms the right sidewall as well as the roof is split approximately in half along a vertical line starting at a point on the right sidewall 70 of the trailer base unit just to the rear of entrance door 43 and continuing to a point directly above on the pipe frame 19. This vertical split permits the alternate choice of rolling up either half of the right wall canvas 50 or erecting either half outwardly to form an awning or canopy over the entrance approach to the trailer. Another alternative permits the two halves of the right wall canvas to be joined together and similarly rolled up together or erected as an awning depending on the ventilation and/or shade desired. The entire right wall canvas 50 is backed up by a mosquito netting to exclude insects regardless of which way the canvas is adjusted.

The superstructure is disassembled and knocked down by following the operations described above but in the reverse order. The only deviation in the procedure being that when the pipe frame 19 has been lowered it is necessary to fold in the excess canvas around the edges to prevent interference with the top cover 18 when it is closed down, and to force upwardly the folding cover braces 40 at their midpoints to start the jackknifing action and thus permit the top cover to be lowered.

While the construction of this trailer, exclusive of the chassis assembly, is indicated in the drawings as being basically of wood construction it is adaptable for construction of various materials. Therefore many modifications in construction and arrangement may be made without departing from the true spirit and scope of this invention as set forth in the appended claims.

I claim:
1. A collapsible camping trailer for touring comprising:
(A) a wheel mounted body having a floor, end and side panels which form an open box-like structure,
(B) a rigid cover for said structure having:
  (1) a first surface which is substantially coextensive with said floor, and
  (2) side surfaces disposed along the outer periphery of and at substantially right angles to said first surface,
said cover being hinged along one of said side surfaces to one of said side panels for pivotal movement with respect to said body between one position wherein said first surface lies in generally opposed relation to said floor so as to overlie and enclose said box-like structure and a raised position wherein said first surface is substantially vertically disposed with respect to said floor so that said cover forms a side wall of the trailer, the location of said side surfaces on said first surface being such that said side surfaces engage said side panels when the cover is in said first position to space the first surface from said floor and when the cover is in said raised position to substantially overhang said body,
(C) a bed panel supported in said body in parallel relation to said floor and spaced therefrom a distance such that said panel and said one side surface are juxtaposed and coplanar when said cover is in said raised position to provide an extended sleeping surface within said enclosure,
(D) a rigid front wall and a rigid rear wall mounted on opposed end panels, respectively, of said body for pivotal movement between a first position substantially parallel to said floor for enclosure by said cover when the cover is in said one position, and a raised position in which the walls are substantially vertically disposed with respect to said floor, said walls in said raised positioned forming the front and rear end walls of the trailer,
(E) connector means carried by the adjoining portions of said cover, front and rear end walls when in said raised positions for securing together the cover, front and rear end walls to form a three-sided enclosure which is wider than said body, and
(F) a flexible material secured to the underside of said cover adjacent to the side surface opposite said one side surface and being of a size sufficient to extend over the top of the three-sided enclosure to form a roof for the trailer when said cover front and rear walls are in said raised positions.

2. A collapsible trailer in accordance with claim 1 and further comprising:
(A) a second bed panel hinged along one of its sides to one of said end walls for pivotal movement between a collapsed position in which it lies adjacent and substantially parallel to said one end wall and a sleeping position in which it is substantially perpendicular to said one end wall,
(B) means including a support member pivotally mounted on one end to the side of said second bed panel opposite said one side thereof and on the other end to said body for supporting said second bed panel when in said sleeping position in spaced parallel relation to said floor, said support member operatively interconnecting said second bed panel and said body so that said second bed panel is moved from said collapsed to said sleeping position in response to the movement of said one wall from said first to said raised position, and
(C) a second bed panel extension supported in said cover juxtaposed to and coplanar with said second bed panel when said one end wall and said cover are in said raised positions to thereby provide an extended second sleeping surface within said enclosure.

3. A collapsible trailer in accordance with claim 2 and wherein said flexible material comprises:
(A) a waterproof fabric sheet which is sufficiently large to enclose the open side of said three-sided enclosure, and
(B) means for releasably securing the other edges of said sheet to said front and rear end walls and to the side panel of said body which is on the open side of said enclosure to thereby fully enclose said structure.

References Cited in the file of this patent
UNITED STATES PATENTS

| | | |
|---|---|---|
| 2,225,993 | Hornberger | Dec. 24, 1940 |
| 2,503,482 | Hamilton | Apr. 11, 1950 |
| 2,582,635 | Kipple | Jan. 15, 1952 |
| 2,779,621 | Vale | Jan. 29, 1957 |
| 2,784,027 | Temp | Mar. 5, 1957 |
| 2,883,713 | Zug | Apr. 28, 1959 |
| 2,930,051 | Kampmeier | Mar. 29, 1960 |
| 2,995,398 | Davenport | Aug. 8, 1961 |